United States Patent [19]

Berchielli et al.

[11] 4,159,367
[45] Jun. 26, 1979

[54] HYDROGEN ELECTROCHEMICAL CELL AND RECHARGEABLE METAL-HYDROGEN BATTERY

[75] Inventors: Aldo S. Berchielli, Westerly, R.I.; Roland F. Chireau, Quaker Hills, Conn.

[73] Assignee: Yardney Electric Corporation, Pawcatuck, Conn.

[21] Appl. No.: 920,586

[22] Filed: Jun. 29, 1978

[51] Int. Cl.$^2$ .................. H01M 8/02; H01M 8/18
[52] U.S. Cl. .................................. 429/38; 429/42; 429/101
[58] Field of Search ............... 429/21, 38, 39, 42, 429/101, 210

[56] References Cited

U.S. PATENT DOCUMENTS

| | | | |
|---|---|---|---|
| 3,600,230 | 8/1971 | Stachurski et al. | 429/42 |
| 3,728,158 | 4/1973 | Poe et al. | 429/210 |
| 3,833,424 | 8/1974 | Louis et al. | 429/210 |
| 3,867,199 | 2/1975 | Dunlop | 429/101 |
| 4,098,962 | 7/1978 | Dennison | 429/101 |

Primary Examiner—Donald L. Walton
Attorney, Agent, or Firm—Donald E. Nist

[57] ABSTRACT

An improved hydrogen electrode comprising a porous sheet of carbon particles catalyzed by platinum or palladium and bonded together with a hydrophobic binder, preferably Teflon, so that the sheet is wetproofed. A conductive metallic screen coated on one side with a hydrophobic binder is laminated on the coated side to the sheet. A battery comprising a stack of the improved hydrogen electrodes, preferably with conductive metallic spacers between the screen of each cell and the cathode of the next adjacent cell forming a bipolar duplex electrode with hydrogen flow passageways to the screen covered face of each anode, is stacked together with an electrolyte filled separator provided between the bipolar relectrodes. The improved hydrogen anode is the anode of the duplex electrode while the cathode of the duplex electrode may be a material such as a porous sintered nickel or silver plaque. The conductive means joining the anode and cathode comprises the metallic screen with or without the metallic spacer present.

21 Claims, 5 Drawing Figures

HYDROGEN ELECTROCHEMICAL CELL AND RECHARGEABLE METAL-HYDROGEN BATTERY

BACKGROUND OF THE INVENTION

1. Field of the Invention

The present invention generally relates to electrochemical means and more particularly to hydrogen anodes, electrochemical cells and batteries of an improved type.

2. Prior Art

There are numerous designs for secondary rechargeable electrochemical batteries. Most are directed specifically to systems employing a metal oxide-to-metal couple, such as the nickel oxide-cadmium couple or the silver oxide-zinc couple. More recently, however, metal-hydrogen secondary electrochemical battery systems, such as U.S. patents as U.S. Pat. Nos. 3,867,199, 3,990,910 and 3,565,691 have become increasingly attractive from the standpoint of obtaining a relatively high volumetric energy density and a larger number of charge-discharge cycles.

In order to provide the necessary high energy density and be commercially feasible, it is essential to have a secondary rechargeable battery comprising a plurality of cells arranged in a compact relationship. The construction of such a battery is complicated, however, when the anode of each cell must, during operation, be freely accessible to hydrogen. Heretofore, the problems of construction have resulted in less than optimal compactness and substantial expense.

It therefore would be highly desirable to provide a high energy density rechargeable secondary electrochemical battery of the metal-hydrogen type having simplified inexpensive construction permitting convenient assembly and efficient charging and discharging with a maximum of compactness.

SUMMARY OF THE INVENTION

The improved hydrogen anode, rechargeable metal-hydrogen cell and battery of the present invention satisfy the foregoing needs. They are substantially as set forth in the Abstract above. Thus, the battery is compact, highly efficient, has high energy density and is of simplified inexpensive construction which permits easy assembly. It includes a plurality of bipolar duplex electrodes in series connection in a pile or stack enclosed in liquid- and gas-tight sealing means which also provide for access of hydrogen only to one face of each anode.

Each duplex electrode consists of a cathode of porous sintered nickel or silver plaque, an anode comprising a sheet of catalyzed carbon particles adhered together with a hydrophobic binder to wetproof the same and provided on one side thereof with a metallic screen laminated thereto. The bipolar electrodes are stacked with a suitable bibulous separator therebetween so as to contact the cathode of a given bipolar electrode and also the anode of the next adjacent bipolar electrode in the stack. The separator bears a sufficient quantity of liquid electrolyte so as to form with the contacted anode and cathode an electrochemical cell in the stack and to impregnate the anode and cathode.

Intercell connection in the stack is through the electrode interfacing, there being no intercell wires or the like. Normally, a porous metallic conductive spacer is disposed against the free surface of the metallic screen and the facing surface of the cathode from the same bipolar electrode in the stack so as to allow free access of hydrogen through the stack spacer and only to the screen covered surface of each hydrogen anode. The gaskets, plus terminal end plates otherwise completely seal the battery.

With the described arrangement, no external or internal wiring is necessary, no complicated piping is needed to provide hydrogen pathways and, moreover, the components of the stack, i.e., the duplex electrodes, separators, gaskets, end terminal plates, etc., can be readily laid up one upon the other so as to rapidly and efficiently form the battery of the invention and provide it with compactness, economy and high energy density. Further features of the present invention are set forth in the following detailed description and accompanying drawings.

DRAWINGS

DETAILED DESCRIPTION

FIG. 1

Figure 1:
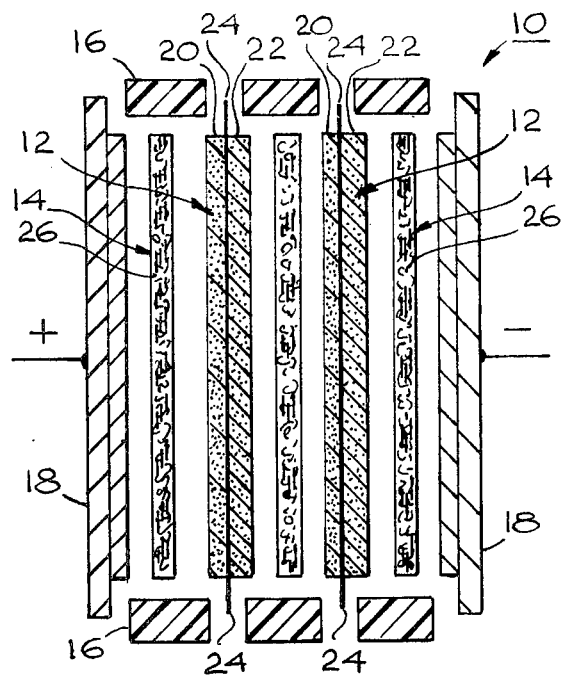
FIG. 1 is a schematic exploded cross-section of a first preferred embodiment of the improved metal-hydrogen battery of the present invention.

Now referring more particularly to FIG. 1 of the accompanying drawings, a first preferred embodiment of the improved battery of the present invention is schematically shown in exploded cross-section. As indicated in FIG. 1 battery 10 comprises a plurality of duplex bipolar electrodes 12 disposed in stacked relation with separators 14 therebetween and sealed in said configuration by peripheral gasket means 16 and terminal end plates 18. Each duplex electrode 12 comprises an anode 20 and a cathode 22 connected in back-to-back relationship by a conductive metallic connector plate 24 or the like. Each anode 20 in turn can comprise the hydrogen electrode of the present invention, such as is more particularly shown in FIGS. 2–4, in the form of a porous sheet of carbon particles which have been catalyzed by platinum or palladium and which have been bonded together with hydrophobic binder so as to wetproof the sheet while retaining its porosity. Each cathode 22 may comprise a nickel or silver porous sintered plaque or the like, such as is more particularly shown in FIGS. 2–4. Gaskets 16 and connector 24 may cooperate to provide means (not shown) for access of hydrogen to only the side of each anode 20 which does not face separator 14. Gaskets 16 otherwise seal battery 10 completely to prevent loss of liquid electrolyte 26 from separators 14. In that regard, separators 14 preferably are bibulous and carry sufficient electrolyte 26 to permeate both the cathode 22 and the anode 20 with which each separator 14 is in direct contact.

FIGS. 2 through 5

Figure 2:
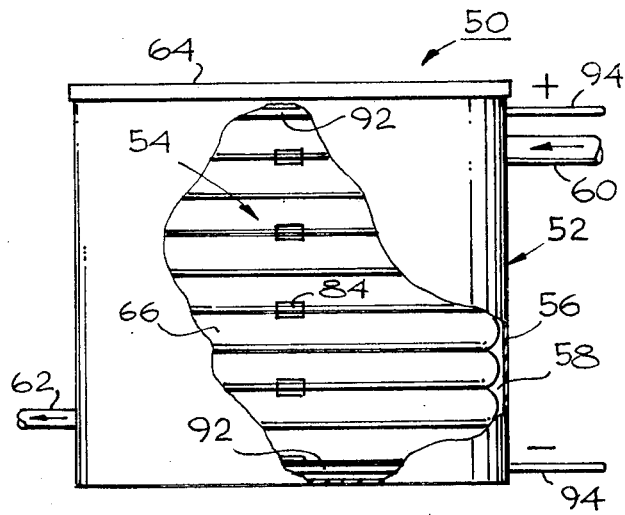
FIG. 2 is a schematic side elevation, partly broken away, of a second preferred embodiment of the improved metal-hydrogen battery of the present invention.
Figure 3:
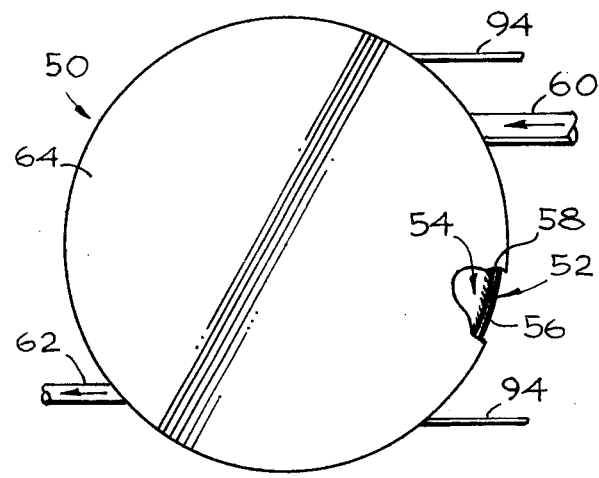
FIG. 3 is a schematic top plan view of the battery of FIG. 2.

A more detailed form of the improved battery of the present invention is set forth in FIGS. 2–5. Thus, FIG. 2 shows a battery 50 which comprises a housing 52 of, for example, electrically insulative material such as plastic, coated metal, glass, ceramic or the like within which the main components of battery 50 are stacked. Housing 52 may be of any suitable size and shape, depending on its uses. For example, as shown in FIG. 3, housing 52 may be cylindrical and of an overall size of 8.92 in. dia.×4.15 in. height. Within housing 52 is disposed a stack or pile 54 of electrochemical components spaced inwardly from the sidewalls 56 of housing 52 so as to provide a peripheral space 58. Space 58 is connected to hydrogen gas inlet 60 and outlet 62 through housing sidewalls 56. Housing 52 also includes a removable threaded lid 64 for easy access to the interior thereof.

Figure 4:
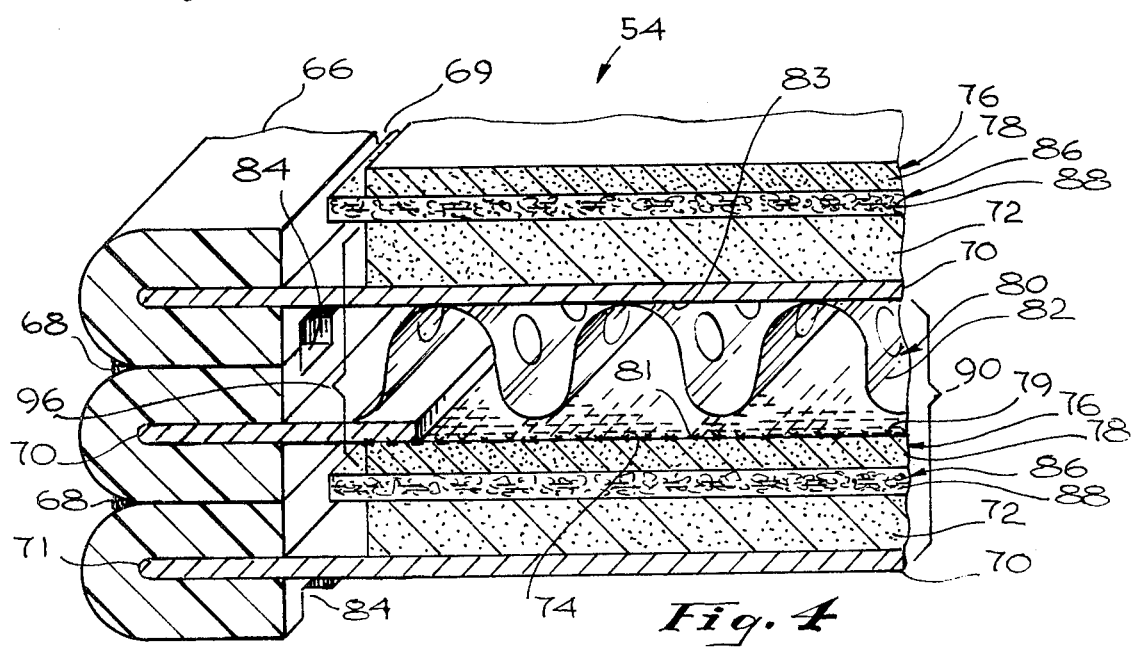
FIG. 4 is an enlarged fragmentary schematic cross-section of the battery of FIG. 2; and, FIG. 5 is an enlarged detail of a portion of the spacer shown in FIG. 4.

Referring more particularly to FIG. 4, it is seen that pile 54 comprises a plurality of stacked, horizontally extending hollow ring-shaped gaskets 66. Gaskets 66 can be of any suitable material such as rubber, epoxy resin-glass laminate or an electrolyte resistant plastic such as termed NORDEL ®, a registered trademark of E. I. du Pont de Nemours, Co., and are stacked vertically one on another and sealed together, as by polychloroprene adhesive, at their contact points 68. Each gasket 66 has the open central part in 69 completely sealed or bridged over by a horizontally extending conductive metallic plate 70 of copper, nickel, silver or the like. Plates 70 are sufficiently large so that their perimeters fit into and are held in recesses in gaskets 66, as shown in FIG. 4.

Certain of plates 70 are imperforate and bear cathodes 72 on the upper surface thereof in the form of flat plates completely covering the exposed central portion of plate 70, that is, that portion not in peripheral recess 71. Each cathode 72 preferably comprises a porous sintered plaque of either nickel oxide or silver oxide prepared in any suitable manner, such as in known in the art. Other suitable cathode plates are as follows: lead oxide, cobalt oxide and manganese dioxide.

Gaskets 66 bearing imperforate plates 70 and cathodes 72 alternate vertically in stack 54 with gaskets 66 bearing perforate plates 70 which are integral with or attached to the periphery of conductive metallic screens 74 of nickel, silver, or the like, disposed in central portion 69 and affixed to hydrogen anodes 76 depending therefrom in portion 69. Each anode 76 comprises a gas porous sheet 78 of carbon particles which have been catalyzed by platinum or palladium and which have been bonded together by selected hydrophobic binder, preferably by polytetrafluoroethylene, or fluorinated ethylenepropylene, to wetproof sheet 78 while retaining its gas porosity. Preferably, the carbon particles of sheet 78 are activated carbon and are of average particle size of about 0.01 to about 0.3 microns. The concentration of hydrophobic binder, by weight, relative to the weight of sheet 78, is usually about ten (10) to about fifty (50) percent, so as to completely wetproof the carbon particles of sheet 78 but still permit sheet 78 to retain sufficient gas porosity for proper operation. Preferably, such gas porosity is about 13 to about 3.4 cm$^3$/sec/cm$^2$. Catalysis of the carbon particles can be achieved by any suitable means, such as selecting a suitable salt of palladium or platinum, for example, the nitrate of either metal, placing it in a suitable solvent, such as an aromatic, for example, acetone, and impregnating sheet 78 therewith and without removing the solvent, then reducing the salt to the metal, as by treatment with hydrazine as follows: by reacting the impregnated sheet with an aqueous solution of 10 weight percent hydrazine. Preferably, the impregnating solution has a concentration of about 0.1 to about 5, percent by weight, of the salt therein, so as to cause the final concentration of catalytic metal in sheet 78 to be about 0.0005 to about 0.1 percent by weight. It will be understood that, if desired, the catalyzing of the carbon particles can be carried out before they are formed into sheet 78. Formation of sheet 78 can, in any event, be carried out by any suitable procedure, such as mixing of the carbon particles with about 20 to about 60 percent by weight of the mixture of an aqueous dispersion of TEFLON ® #42 emulsion containing about 48 percent, by weight, of polytetrafluoroethylene, extruding the mixture into sheet form under 2000 psi. pressure and drying the resulting sheet to remove the residual water.

Figure 5:
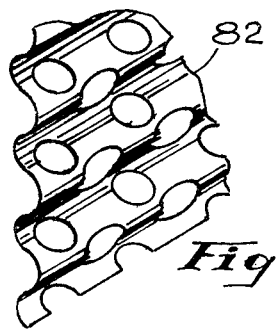

Screen 74 adheres to sheet 78 by any suitable means, such as by a coating (not shown) of selected hydrophobic material, such as fluorinated ethylene-propylene copolymer (FEP) or polyvinylidene fluoride known as KYNAR ®, a registered trademark of Pennsalt Chemicals Corporation, which has been applied only to that side of screen 74 which contacts sheet 78. The upper surface of sheet 78, that is, the surface 79, which is covered by screen 74, is exposed to hydrogen gas during operation of battery 50. Preferably a metallic conductive spacer 80 which is gas porous, for example, a flexible, spring-like perforated corrugated metallic sheet 82 of nickel, stainless steel or the like, as shown particularly in FIG. 5, is electrically connected to the upper surface 81 of screen 74 and is configured to electrically connect to the lower surface 83 of the plate 70 next above it in stack 54, as shown particularly in FIG. 4. This spacer 80 cooperates with and is at the level of passageways 84 extending radially through and defined by selected adjoining gaskets 66, as shown in FIG. 4. Passageways 84 thus extend through the sidewall of gaskets 66 and into contact with peripheral space 58 at the level of each screen 74 and spacer 80 so as to permit free flow of hydrogen from space 58 into contact with only anodes 76, specifically only the upper surfaces 79 thereof covered by screens 74. This is necessary for proper and efficient operation of battery 50. Hydrogen, as previously indicated, enters and exits housing 52 though piping 60 and 62.

The lower face of each anode 76 and the upper face of each cathode 72 next adjacent thereto (below) are contacted by and fully covered and sealed by a separator 86 which preferably is of bibulous material and, in any event, contains a substantial quantity of liquid electrolyte 88. Such electrolyte 88 may be, for example, an alkali metal hydroxide such as potassium hydroxide, sodium hydroxide or lithium hydroxide and the separator 86 material preferably is cotton or other cellulosic material in wadding, batted or sheeted form, or a suitable plastic, or porous inorganic fiber material. Gaskets 66 prevent leakage of electrolyte 88 from pile 54.

In each instance, the combination of separator 86 with its electrolyte 88 in contact with an anode 76 and cathode 72 within the sealing means comprising gaskets 66 and imperforate plates 70 and including means for providing hydrogen access to the anode 76, that is, passageway 84, perforate plate 70, screen 74 and spacer 80, forms a separate one of the improved electrochemical cells 90, in accordance with the present invention. Such cells 90 are in stacked relationship in pile 54 and are series connected without the use of external conductive bus bars, tabs, wires or the like. Instead, current passes vertically through pile 54 from each imperforate conductive plate 70, cathode 72, electrolyte 88, anode 76, screen 74 (with its associated plate 70) and spacer 80 to the next imperforate plate 70 vertically in 54. It will be understood that perforate plates could be nonconductive in which event the electrically conductive pathway would be from anode 76 through screen 74 and spacer 80 to imperforate plate 70. Horizontally extending conductive imperforate metal terminal end plates 92 of the appropriate polarity and fabricated of nickel, silver, stainless steel or copper sheet, are provided on the top and the bottom of stack 54 in contact with components of the stack, specifically an anode 76 at one end of stack 54 and a cathode 72 at the opposite end of stack 54, so as to complete battery 50. Plates 92 are electrically connected to conductor lines 94 leading from housing 52. End plates 92 need not be conductive provided that the end electrodes in the pile 54 contain conductive tabs, lines, buss bars or the like.

Duplex electrodes 96 can be considered to be, for the purposes of the present invention, relative to battery 50, the electrochemical components between adjacent separators 86. Thus, in each instance, imperforate plate 70 with cathode 72 thereon, spacer 80 contacting such plate 70, the next lower perforate plate 70, and screen 74 with depending anode 76 comprise duplex electrode 96. The two named plates 70, spacer 80 and screen 74 together form the conductive connector holding anode 76 and cathode 72 in back-to-back relationship. If desired, each duplex electrode 96 with its associated gaskets 66 can be formed into a separate unit and a plurality of these units can be vertically stacked, with separators 86 (containing electrolyte 88) placed therebetween to form pile 54.

Further features of the present invention are set forth in the following specific examples:

EXAMPLE I

An improved hydrogen electrode in accordance with the present invention was formed by mixing together 100 gm of activated carbon particles having an average particle size of 0.1 $\mu$m and 60 gm of an aqueous dispersion of a hydrophobic binder comprising polytetraflurorethylene in a concentration in the binder of 45% by weight. The resulting mixture was then extruded as a sheet having the following dimensions 25 cm × 25 cm. The sheet was then air dried at 680° F. for one hour, after which it was immersed in an acetone solution containing 0.1% by weight of palladium nitrate. The sheet was withdrawn from the acetone solution after two seconds, after which the palladium nitrate which had been deposed therein from the acetone solution was reduced to palladium metal with hydrazine by the following procedure: the impregnated sheet is reacted with an aqueous solution containing 10 weight percent hydrazine. The reduction procedure resulted in a concentration of 0.005%, by weight of the sheet, of palladium metal in the sheet. The resulting finished sheet had a porosity of about 50%. A nickel screen having an average U.S. standard mesh size of 70×70 was then coated on one side thereof with an aqueous dispersion of fluorinated ethylene-propylene polymer having a concentration in the dispersion of about 30% by weight. While the coating was still tacky, the coated side of the screen was attached to one side of the above-described sheet under pressure and dried in place to firmly secure the screen to the sheet. An improved hydrogen electrode was thus formed which was suitable for use in the battery of the present invention. A plurality of G-12 (epoxy-glass laminate) gaskets having the following shape and size dimensions were used: 9.7 cm dia. ×0.189 cm thick. Each gasket had a horizontally extending annular recess therein sufficiently large to receive a nickel plate having the following dimensions: 8.5 cm dia.×0.013 cm thick. Certain of the nickel plates were imperforate while others of the nickel plates had a central opening therein about 7.2 cm in size.

An improved battery of the present invention was assembled by disposing on the upper surface of each imperforate plate a sintered nickel plaque cathode extending to the inner periphery of each gasket, and having the following characteristics: 0.089 cm thickness, 7.5 cm diameter, and a porosity of about 80% and other characteristics as follows: an impregnated capacity of 0.065–0.079 ampere hours per square centimeter of plaque.

On the top of each such cathode was disposed a separator completely covering the top surface of the cathode and comprising a fibrous cellulosic wadding having an average thickness of about 0.05 cm and containing potassium hydroxide electrolyte in a concentration of about 160% by weight of the separator.

On the upper surface of this separator was then disposed the anode hydrophobic sheet previously described and cut to size so as to extend to the inner periphery of the gaskets with which it was associated. In this regard, a gasket containing one of the perforate plates installed therein was then disposed on the upper surface of the screen attached to the upper surface of the anodic sheet. In each instance the said periphery of the screen contacted the solid portion of the plate. The gasket holding this plate was vertically aligned on the gasket containing the imperforate plate 70 and the horizontal contact points therebetween were sealed together by epoxy adhesive means. A corrugated perforated nickel spacer plate was then placed over and in contact with the upper surface of the perforate plate and the described nickel screen. The spacer was of an average thickness of about 0.19 cm. It was dimensioned to contact the undersurface of an imperforate plate when that plate was disposed in gasket means and placed next above the spacer in the stack. This procedure was continued until the full desired stack was obtained. The bottommost imperforate plate served as a terminal end plate while the uppermost imperforate plate served as a terminal end plate of opposite polarity and did not have any components disposed thereabove. At the level of each spacer the adjacent gaskets were configured to provide passageways permitting access of hydrogen from outside the stack into contact with the spacer screen and adjacent side of the anode sheet. The stack was otherwise fully sealed so as to prevent liquid and gas access therefrom. The full stack contained seven gaskets, three cells in each instance comprising one of the described cathodes, one of the described anodes with a separator in contact therebetween ad one of the described screens and spacers. Each cell was physically isolated by an imperforate plate at each end thereof. The cells were series connected internally by means of the plates, spacers and screens. The stack had the following dimensions: 9.7 cm dia.×1.35 cm height. The stack was disposed within a container of stainless steel 316 having the following internal dimensions: 10.4 cm dia×10.16 cm height. This provided a peripheral space in the container around the gaskets for free circulation of hydrogen. The free volume in the container was about 760 cm$^3$. The battery had the following electrical characteristics: when preloaded with hydrogen gas to 10 psig, charged at the ten hour rate, and then discharged at the four hour rate, the battery delivered 1.25 ampere ours at an average voltage of 3.7 volts. This corresponds to an output of 4.6 watt-hours and stack specific energy of 0.05 watt hours per cm.$^3$.

As can be seen from the above, the battery was simple to assemble from easily manufactured components and could be made of any desired size and number of cells. The spacers therein were dimensioned so as to effect springlike contact by the horizontal conductive plates and other components to insure proper electrical conductivity throughout the stack. The electrolyte in each cell wetted the porous faces of the adjoining cathode and anode for full operation of the cell, while hydrogen gas had free access to the opposite dry face of the anode. Accordingly, the battery could perform through many charging and discharging cylces without substantial loss of performance and yet could be manufactured rapidly, simply and inexpensively.

EXAMPLE II

The procedure of Example I was carried out except that the gaskets were of NORDEL ® and had the following configuration and size: 9.7 cm dia×0.189 cm thick. Moreover, the conductive plates were silver of about 0.013 cm average thickness, the spacers were of silver of about 0.19 cm thickness, the hydrophobic binder in the sheet anode was FEP ® fluoropolymer, the catalyst was platinum in a concentration of about 0.01% by weight of said sheet, the screen was silver of average U.S. standard mesh size of 40×40, the separator had an average thickness of 0.05 cm and comprised an organic-inorganic fiber laminate and the electrolyte was sodium hydroxide. A 3 cell battery of the electrochemical cells formed from these components was laid up as described in Example I to form a stack disposed in a housing of stainless steel having a peripheral hydrogen space of about 760 cc. The battery had the following overall dimensions and electrical characteristics: 9.7 cm dia×1.35 cm height; when preloaded and cycled similarly to the battery of Example I, this battery delivered 2.5 ampere hours at an average voltage of 3.45 volts; 8.6 watt hours; 0.09 watt hours per cm$^3$. This battery gave about twice the output obtained from that of Example I.

Various modifications, changes alterations and additions can be made in the improved hydrogen electrode, electrochemical cell and battery of the present invention and in the components and parameters of each. All such modifications, changes, alterations and additions as are within the scope of the above-mentioned claims form part of the present invention.

What is claimed is:

1. An improved hydrogen electrode for a rechargeable metal-hydrogen electrochemical cell, said electrode comprising, in combination:
   a. a porous, wet-proofed, catalyzed sheet of carbon particles bonded together with hydrophobic binder; and,
   b. a conductive metallic screen coated on one side thereof with hydrophobic binder and laminated on said one side to said sheet.

2. The improved hydrogen electrode of claim 1 wherein said sheet contains catalyst which comprises at least one of palladium and platinum.

3. The improved hydrogen electrode of claim 1 wherein said hydrophobic binder comprises polytetrafluoroethylene in a concentration of about 25-35 percent, based upon the weight of said sheet.

4. The improved hydrogen electrode of claim 1 wherein said metallic screen comprises nickel and said hydrophobic binder coated on said one side of said screen comprises fluorinated ethylene-propylene polymer.

5. The improved hydrogen electrode of claim 2 wherein said catalyst comprises palladium in a concentration of about 0.1 mg/cm$^2$.

6. The improved hydrogen electrode of claim 1 wherein the pore size of said carbon sheet is about 5-10 μm, wherein said carbon surface area is about 500 m$^2$/gm, wherein said electrode weight is about 0.18 gm/cm$^2$ and wherein said electrode thickness is about 0.4 mm.

7. An improved rechargeable metal-hydrogen electrochemical cell, said cell comprising, in combination:
   a. an improved hydrogen anode including:
      i. a porous wet-proofed catalyzed sheet of carbon particles bonded together with hydrophobic binder; and,
      ii. a conductive metallic screen coated on one side thereof with hydrophobic binder and laminated on said one side to said sheet;
   b. a cathode facing the screen-free side of said anode;
   c. a separator disposed between and in contact with said anode and cathode, said separator comprising a bibulous layer containing sufficient liquid electrolyte to penetrate and substantially fill the pores of said cathode, said separator being in direct contact with said sheet; and,
   d. sealing means enclosing said cell to prevent leakage of said electrolyte therefrom, said sealing means comprising peripheral gasket means defining hydrogen flow passageways leading to the surface of said sheet covered by said screen.

8. The improved electrochemical cell of claim 7 wherein spacer means space said screen from said sealing means and help define said gas passageways.

9. The improved electrochemical cell of claim 7 wherein said sealing means include electrically conductive terminal end plates.

10. The improved electrochemical cell of claim 7 wherein said anode includes a catalyst comprising at least one of palladium and platinum, wherein said metallic screen comprises nickel and wherein said hydrophobic binder of said carbon particles comprises polytetrafluorethylene in a concentration of about 25-35 percent by weight of said sheet.

11. The improved electrochemical cell of claim 7 wherein said hydrophobic binder on said screen comprises fluorinated ethylene-propylene polymer, wherein said catalyst comprises palladium in a concentration of about 0.1 mg/cm$^2$, wherein the pore size of said carbon sheet is about 5-10 μm, and wherein said carbon surface layer is about 500 m$^2$/gm.

12. The improved electrochemical cell of claim 7 wherein said cathode comprises a flat porous sintered nickel plaque and wherein said electrolyte comprises alkali metal hydroxide.

13. The improved electrochemical cell of claim 10 wherein said terminal end plates comprise nickel and wherein said spacer comprises a corrugated perforated nickel sheet.

14. An improved rechargeable metal-hydrogen electrochemical battery, said battery comprising, in combination:

a. a plurality of improved bipolar duplex electrodes disposed in stacked relation and similarly oriented so that the cathode of each said electrode is adjacent the anode of the next adjacent electrode in said stack, each said duplex electrode comprising a cathode, an anode and a non-porous conductive sheet joining said anode and cathode in back-to-back relation to form an integral unit;

b. a plurality of separators containing liquid electrolyte, said separators being disposed between adjacent ones of said duplex electrodes so as in each instance to contact the anode of one duplex electrode and the cathode of the next adjacent of said duplex electrodes;

c. sealing means including gasket means enclosing the periphery of said stack to prevent liquid and electrical leakage from said stack, said gasket means including passageways to facilitate access of hydrogen to said anodes.

15. The improved rechargeable metal-hydrogen electrochemical battery of claim 14 wherein said anode comprises a porous granular carbon layer wetproofed with binder, a metallic screen laminated on one side thereof to said sheet and connected on the opposite side thereof to a conductive porous spacer cooperating with said passageways permit access of said hydrogen to said carbon layer.

16. An improved rechargeable metal-hydrogen electrochemical battery of claim 14 wherein said cathode comprises a flat porous sintered nickel plaque impregnated with nickel hydroxide and bonded to said conducting sheet which comprises nickel foil.

17. The improved rechargeable metal-hydrogen electrochemical battery of claim 14 wherein said separator comprises a bibulous layer completely covering said cathode within which it is in contact and containing sufficient of said electrolyte to fill the pores of said cathode.

18. The improved rechargeable metal-hydrogen electrochemical battery of claim 14 wherein said gasket means comprises a plurality of joined seals, each said seal embracing the edge of one of said conducting sheets.

19. The improved rechargeable metal-hydrogen electrochemical battery of claim 14 wherein said stack is provided at each end thereof with a terminal end plate of appropriate polarity.

20. The improved rechargeable metal-hydrogen electrochemical battery of claim 15 wherein said carbon layer of said anode is porous to hydrogen but liquid impervious, the carbon particles is said layer being coated with polytetrafluoroethylene, wherein said metallic screen is coated with a fluoroethylene polymer on the side thereof facing said carbon layer and laminated to said carbon sheet and is electrically connected to said metallic porous intercell spacer, said spacer being springlike to provide support to said stack, as well as electrical conductivity.

21. The improved rechargeable metal-hydrogen electrochemical battery of claim 15 wherein said electrolyte comprises alkali metal hydroxide in a concentration sufficient to fully impregnate said separator and wherein said separator comprises inorganic fibrous laminate material.

* * * * *